United States Patent
Yamada et al.

(10) Patent No.: US 8,428,825 B2
(45) Date of Patent: Apr. 23, 2013

(54) SEATBELT CONTROL DEVICE

(75) Inventors: Shuji Yamada, Miyoshi (JP); Kazunori Nogi, Susono (JP); Yujiro Miyata, Kasugai (JP); Shinji Ito, Aichi-ken (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 421 days.

(21) Appl. No.: 12/866,989

(22) PCT Filed: Feb. 13, 2009

(86) PCT No.: PCT/IB2009/000248
§ 371 (c)(1),
(2), (4) Date: Oct. 18, 2010

(87) PCT Pub. No.: WO2009/101512
PCT Pub. Date: Aug. 20, 2009

(65) Prior Publication Data
US 2011/0035117 A1    Feb. 10, 2011

(30) Foreign Application Priority Data
Feb. 15, 2008    (JP) .................................. 2008-034043

(51) Int. Cl.
*B60R 22/00*    (2006.01)

(52) U.S. Cl.
USPC .......................................................... 701/45

(58) Field of Classification Search ........................ None
See application file for complete search history.

(56) References Cited

U.S. PATENT DOCUMENTS

| 6,892,122 B2 | 5/2005 | Miyata et al. |
| 7,350,808 B2 | 4/2008 | Miyata et al. |
| 2007/0001047 A1 | 1/2007 | Yasuda et al. |

FOREIGN PATENT DOCUMENTS

| EP | 1 498 325 A1 | 1/2005 |
| JP | B2-3487279 | 1/2004 |
| JP | B2-3608052 | 1/2005 |
| JP | A-2007-84042 | 4/2007 |

OTHER PUBLICATIONS

International Search Report dated May 12, 2009 for corresponding International Application No. PCT/IB2009/000248.
Written Opinion of the International Searching Authority dated May 12, 2009 for corresponding International Application No. PCT/IB2009/000248.

*Primary Examiner* — Thomas Tarcza
*Assistant Examiner* — Adam Alharbi
(74) *Attorney, Agent, or Firm* — Oliff & Berridge, PLC

(57) ABSTRACT

In the case of a severe collision, the severity of the collision exceeds a first threshold value at which a pretensioner mechanism starts to activate, and then exceeds a second threshold value within a collision-discriminating time range T following the start of the activation; therefore, the force limiter mechanism unit is set at a high load. In the case of a gentle collision, the severity of the collision exceeds the first threshold value, at which the pretensioner mechanism starts to activate, but does not exceed the second threshold value within the collision-discriminating time range T following the start of the activation; therefore the force limiter mechanism unit is set at a low load. Therefore, without a determination delay, the switching of the force limiter mechanism can be appropriately selected.

20 Claims, 7 Drawing Sheets

SEATBELT CONTROL DEVICE

BACKGROUND OF THE INVENTION

1. Field of the Invention

The invention relates to a seatbelt control device and, more particularly, to a seatbelt control device that controls a force limiter mechanism that restricts the load applied to an occupant by the tension of a seatbelt to or below a certain amount at the time of an emergency.

2. Description of the Related Art

A seatbelt retractor device provided in a vehicle restrains an occupant's body from moving forward relative to the vehicle at the time of a sharp deceleration state of the vehicle, as a spool for winding up and letting out the seatbelt is locked by a lock mechanism.

Besides, a seatbelt retractor device equipped with a pretensioner mechanism that forcibly winds the seatbelt has already been proposed. There also has been proposed a seatbelt retractor device equipped with a force limiter mechanism that lessens the restraining force by utilizing the twist of a torsion bar, or the like, when an occupant's body that moves forward by an inertia force pulls the seatbelt by an excessively large force (when an excessively large force is applied to an occupant's body via the seatbelt).

Besides, as for the force limiter mechanism, a selectable force limiter mechanism in which the load corresponding to the restraining force can be selected is provided in some seatbelt retractor devices.

For example, a technology described in Japanese Patent Application Publication-No. 2007-84042 (JP-A-2007-84042) lessens the restraining force by utilizing the magnitude of the force that twists the torsion bar. Then, there is proposed a technology of a force limiter mechanism in which the magnitude of load at which the lessening of the restraining force is started can be selected between a predetermined high load and a predetermined low load by utilizing a micro gas generator (MGG). In this force limiter mechanism, the load at which the lessening of the restraining force is started is set at the high load in the initial state of setting, and then if the body size of an occupant is small, the technology switches it to the low load.

However, in the case of a construction in which a degree of a collision is determined, and in which if it is determined that the collision is a gentle collision, a gas generator is activated to switch the set load value, it sometimes happens that the switching of the load at which to start the lessening of the restraining force is delayed if the determination regarding the degree of collision is delayed.

SUMMARY OF THE INVENTION

The invention has been accomplished by taking the forgoing facts into account. It is an object of the invention to appropriately select the switching of a force limiter mechanism.

A seatbelt control device according to a first aspect of the invention includes: a pretensioner mechanism that heightens tension of a seatbelt by winding the seatbelt; a force limiter mechanism capable of changing magnitude of a load at which to start lessening the tension of the seatbelt wound by the pretensioner mechanism; a detection portion that detects a physical quantity related to magnitude of a collision; and a control portion that activates the pretensioner mechanism if the physical quantity detected by the detection portion has exceeded a first threshold value, and that performs such a control that the load in a case where the physical quantity has exceeded a second threshold value that is larger than the first threshold value within a predetermined time following activation of the pretensioner mechanism is larger than the load in a case where the physical quantity does not exceed the second threshold value within the predetermined time.

According to the seatbelt control device of the first aspect, the pretensioner mechanism winds the seatbelt to heighten the tension of the seatbelt, and the force limiter mechanism is capable of changing the load at which to start lessening the tension of the seatbelt wound by the pretensioner mechanism.

Besides, the detection portion detects the physical quantity related to the magnitude of collision. For example, the detection portion detects a physical quantity such as the collision velocity at the time of a collision, the deceleration caused by the collision, etc.

Then, the control portion activates the pretensioner mechanism in the case where the physical quantity detected by the detection portion has exceeded the first threshold value. Besides, by the control portion, the load at which to start lessening the tension of the seatbelt in the case where the physical quantity detected by the detection portion within the predetermined time following the activation of the pretensioner mechanism has exceeded the second threshold value that is larger than the first threshold value is controlled at a load that is larger than the load at which to start lessening the tension of the seatbelt in the case where the physical quantity detected by the detection portion within the predetermined time following the activation of the pretensioner mechanism does not exceed the second threshold value.

That is, since the load of the force limiter mechanism is controlled by using as a limit the predetermined time following the activation of the pretensioner mechanism, it is possible to prevent a delay in the switching of the force limiter mechanism which is caused by a determination delay, and it is possible to appropriately select the switching of the force limiter mechanism.

The force limiter mechanism may be capable of changing, for example, the load at which to start lessening the tension of the seatbelt, between a first load and a second load that is smaller than the first load.

Besides, in the case where the force limiter mechanism is capable of changing the load between the first load and the second load, the force limiter mechanism may be set at the first load as an initial state, and the control portion may cause the first load to be maintained in the case where the physical quantity detected by the detection portion has exceeded the second threshold value within the predetermined time, and the control portion may switch the load to the second load in the case where the physical quantity detected by the detection portion does not exceed the second threshold value within the predetermined time; alternatively, the force limiter mechanism may be set at the second load as an initial state, and the control portion may switch the load to the first load in the case where the physical quantity detected by the detection portion has exceeded the second threshold value within the predetermined time, and the control portion may maintain the second load in the case where the physical quantity detected by the detection portion does not exceed the second threshold value within the predetermined time. In either one of these two permissible constructions, the load of the force limiter mechanism is controlled, with the predetermined time being used as a limit. Therefore, the delay in the switching of the force limiter mechanism caused by the determination delay can be prevented, and the switching of the force limiter mechanism can be appropriately selected. Besides, in the construction in which the force limiter mechanism is set at the second load that is smaller than the first load as an initial state, and maintains the second load in the case where the physical quantity does not exceed the second threshold value within the predetermined time, it never happens that the set load of the force limiter at the time of a gentle collision becomes the high load due to a delay in switching the force limiter's set load at the time of the gentle collision.

A seatbelt control device according to a second aspect of the invention includes: a pretensioner mechanism that heightens tension of a seatbelt by winding the seatbelt; a force limiter mechanism capable of changing magnitude of a load at which to start lessening the tension of the seatbelt wound by the pretensioner mechanism; a detection portion that detects a physical quantity related to magnitude of a collision; and a control portion that activates the pretensioner mechanism if the physical quantity detected by the detection portion has exceeded a first threshold value, and that discerns whether or not the physical quantity is likely to exceed a second threshold value that is larger than the first threshold value within a predetermined time following activation of the pretensioner mechanism, and sets the load in a case where the physical quantity is likely to exceed the second threshold value at a load that is larger than the load in a case where the physical quantity is not likely to exceed the second threshold value within the predetermined time.

According to the seatbelt control device of the second aspect, the pretensioner mechanism heightens the tension of the seatbelt by winding the seatbelt, and the force limiter mechanism is capable of changing the load at which to start the seatbelt wound by the pretensioner mechanism.

Besides, the detection portion detects the physical quantity related to the magnitude of collision. For example, the detection portion detects a physical quantity such as the collision velocity at the time of a collision, the deceleration caused by the collision, etc.

Then, the control portion activates the pretensioner mechanism if the physical quantity detected by the detection portion has exceeded the first threshold value, and discerns whether or not the physical quantity detected by the detection portion is likely to exceed the second threshold value that is larger than the first threshold value within the predetermined time following the activation of the pretensioner mechanism. For example, a rate of change in the physical quantity may be found based on a detection result provided by the detection portion, and it may be discerned whether or not the second threshold value is likely to be exceeded, through prediction based on the rate of change.

Then, the load at which to start lessening the tension of the seatbelt in the case where the second threshold value is likely to be exceeded is set at a load that is larger than the load at which to start lessening the tension of the seatbelt in the case where the physical quantity detected by the detection portion within the predetermined time following the activation of the pretensioner mechanism does not exceed the second threshold value.

That is, since the load of the force limiter mechanism is set by predicting whether or not the second threshold value is likely to be exceeded within the predetermined time following the start of the activation of the pretensioner mechanism, it is possible to prevent a delay in the switching of the force limiter mechanism which is caused by a determination delay, and it is possible to appropriately select the switching of the force limiter mechanism.

The force limiter mechanism may be capable of changing, for example, the load at which to start lessening the tension of the seatbelt, between a first load and a second load that is smaller than the first load.

Besides, in the case where the force limiter mechanism is capable of changing the load between the first load and the second load, the force limiter mechanism may be set at the first load as an initial state, and the control portion may cause the first load to be maintained in the case where the physical quantity detected by the detection portion is likely to exceed the second threshold value within the predetermined time, and the control portion may switch the load to the second load in the case where the physical quantity detected by the detection portion is not likely to exceed the second threshold value within the predetermined time; alternatively, the force limiter mechanism may be set at the second load as an initial state, and the control portion may switch the load to the first load in the case where the physical quantity detected by the detection portion is likely to exceed the second threshold value within the predetermined time, and the control portion may maintain the second load in the case where the physical quantity detected by the detection portion is not likely to exceed the second threshold value within the predetermined time. In either one of these two permissible constructions, the load of the force limiter mechanism is set by predicting whether or not the second threshold value is likely to be exceeded within the predetermined time. Therefore, the delay in the switching of the force limiter mechanism caused by the determination delay can be prevented, and the switching of the force limiter mechanism can be appropriately selected. As a method of predicting whether or not the second threshold value is likely to be exceeded within the predetermined time, the control portion may find a rate of change in the physical quantity from a detection result provided by the detection portion, and may predict whether or not the physical quantity is likely to exceed the second threshold value through prediction based on the rate of change. The rate of change in the physical quantity which is used at that occasion may be calculated from a physical quantity at a specific timing in a period from a point of a minimum until the second threshold value that is larger than the minimum is reached, which is a physical quantity detected by the detection portion.

Besides, the control portion may control the force limiter mechanism so that a set load is achieved after the predetermined time elapses. Instead of this, the control portion may control the force limiter mechanism so that a set load is achieved even before the predetermined time elapses, if it is predicted based on the rate of change that the second threshold value is exceeded.

As for the predetermined time, such a time that a determination delay will not occur in the case where the collision velocity is a predetermined high velocity, or where the collision deceleration is a predetermined deceleration, is set beforehand on the basis of results of experiment.

Effects of the Invention

As described above, according to the aspects and constructions of the invention, the following effects are achieve. That is, the force limiter mechanism is controlled so that the load at which to start lessening the tension of the seatbelt in the case where a physical quantity related to the magnitude of collision has exceeded the second threshold value (or is likely to exceed the second threshold value) that is larger than the first threshold value at which the pretensioner mechanism is activated, within the predetermined time following the activation of the pretensioner mechanism, is larger than the load at which to start lessening the tension of the seatbelt in the case where the physical quantity related to the magnitude of collision does not exceed the second threshold value within the predetermined time following the activation of the pretensioner mechanism. Therefore, by controlling the load of the force limiter mechanism using the predetermined time as a limit, the determination delay can be prevented, so that the switching of the force limiter mechanism can be appropriately selected.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

An exemplary embodiment of the invention will be described hereinafter with reference to the drawings.

Figure 1A:
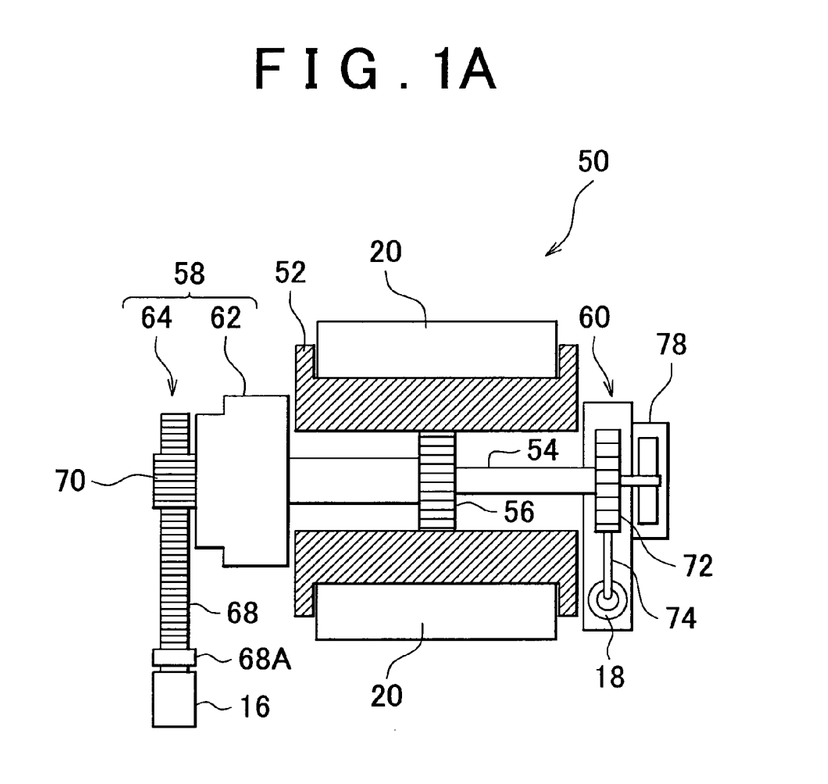
FIG. 1A is a diagram showing a general construction of a seatbelt retractor device that is a control object of a seatbelt control device in accordance with an embodiment of the invention.
Figure 1B:
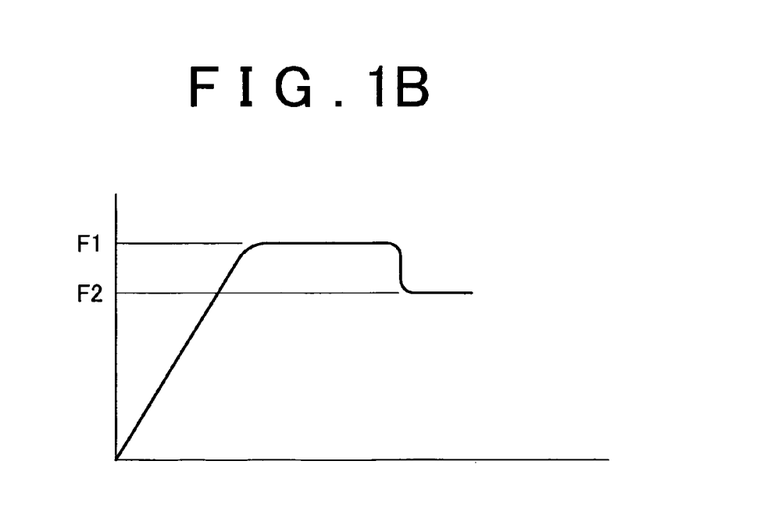
FIG. 1B is a diagram showing the seatbelt tension of the seatbelt control device in accordance with the embodiment.

FIG. 1 is a diagram showing a general construction of a seatbelt retractor device that is a control object of a seatbelt control device in accordance with an embodiment of the invention.

A seatbelt retractor device 50 includes a spool 52 that winds up a seatbelt 20 as shown in FIG. 1A. A center portion of the spool 52 is a hollow. In the hollow portion, a torsion bar 54 is provided. The torsion bar 54 is linked to the spool 52, at the vicinity of the center thereof, via a linkage member 56, and functions as a rotating shaft of the spool 52. Besides, the torsion bar 54 has different diameters on the two opposite sides of the linkage member 56. In this embodiment, the diameter of the torsion bar 54 on a side of the linkage member 56 that is toward a pretensioner mechanism unit 58 is larger than the diameter thereof on the other side of the linkage member 56, which is toward a force limiter mechanism unit 60. Incidentally, as for the torsion bar 54, the portion thereof on the force limiter mechanism unit 60 side and the portion on the pretensioner mechanism unit 58 side may be different portions of a single member, or may also be separate structures that are fixed to each other by the linkage member 56.

An end of the torsion bar 54 is provided with the pretensioner mechanism unit 58, and the opposite end thereof is provided with the force limiter mechanism unit 60 described later.

The pretensioner mechanism unit 58 includes a belt lock mechanism 62 and a pretensioner mechanism 64.

The belt lock mechanism 62 is designed so as to lock the rotation of the spool 52 when a predetermined load is applied. Since various known technologies can be applied to this belt lock mechanism, detailed description thereof is omitted herein.

The pretensioner mechanism 64 includes a pretensioner-dedicated gas generator (inflator) 16 that generates gas, a piston rack 68, and a pinion 70. The pretensioner mechanism unit 58 is designed so that when the pretensioner-dedicated inflator 16 is ignited, a piston 68A of the piston rack 68 is pushed out rotating the spool 52 due to the engagement between a rack gear of the piston rack 68 and the pinion 70.

On the other hand, the force limiter mechanism unit 60 is a mechanism for keeping the tension of the seatbelt 20 constant in a manner described below when a tension exceeding a predetermined load is applied to the seatbelt 20 while the belt lock mechanism 62 is in a locked state. That is, with such a load, the torsion bar 54 is twisted, so that the spool 52 linked to the torsion bar 54 via the linkage member 56 rotates to let out the seatbelt 20 so as to maintain a constant tension.

To give a more detailed description, the force limiter mechanism unit 60 includes a gear 72 engaged with the torsion bar 54, a cam 74, and a force limiter-dedicated micro gas generator (MGG) 18.

The gear 72 is provided with a lock member that restricts the rotation of the gear 72 by engaging with the cam 74 when a tension exceeding the predetermined load acts on the seatbelt 20.

When the force limiter-dedicated MGG 18 is ignited, the cam 74 is moved by the pressure of the gas so that the cam 74 does not mesh with the gear 72 and therefore does not lock or restrict the gear 72 even if a tension exceeding the predetermined load acts on the seatbelt 20.

Furthermore, a spring mechanism 78 for urging the spool 52 in a wind-up direction is provided on an outer side of the force limiter mechanism unit 60. By the spring mechanism 78, the seatbelt 20 is wound around the spool 52.

In this embodiment, as the pretensioner mechanism 64 activates, the seatbelt 20 is wound. Then, if the seatbelt 20 is drawn out by forward movement of the occupant, the belt lock mechanism 62 locks, and the force limiter mechanism unit 60 begins to work.

The force limiter mechanism unit 60 locks the cam 74 and the gear 72 by the lock member. Besides, when a tension exceeding the predetermined load while the cam 74 and the gear 72 are in the engaged state, the whole torsion bar 54 is twisted and the spool 52 linked to the torsion bar 54 via the linkage member 56 rotates to let out the seatbelt 20 so as to keep the belt tension constant.

Besides, when the force limiter-dedicated MGG 18 is ignited, the meshing between the cam 74 and the gear 72 of the force limiter mechanism unit 60 is released, so that the torsion bar 54 is twisted only in the large-diameter portion thereof on the pretensioner mechanism unit 58 side of the linkage member 56, and therefore the spool 52 linked to the torsion bar 54 via the linkage member 56 rotates to let out the seatbelt 20 so that the belt tension is kept constant at a lower tension than during the engaged state of the cam 74 and the gear 72.

That is, in the case where the force limiter-dedicated MGG 18 is not ignited, the tension of the seatbelt 20 is kept at a tension F1 shown in FIG. 1B, and in the case where the force limiter-dedicated MGG 18 has been ignited, the tension of the seatbelt 20 is kept at a tension F2 shown in FIG. 1B.

Figure 2:
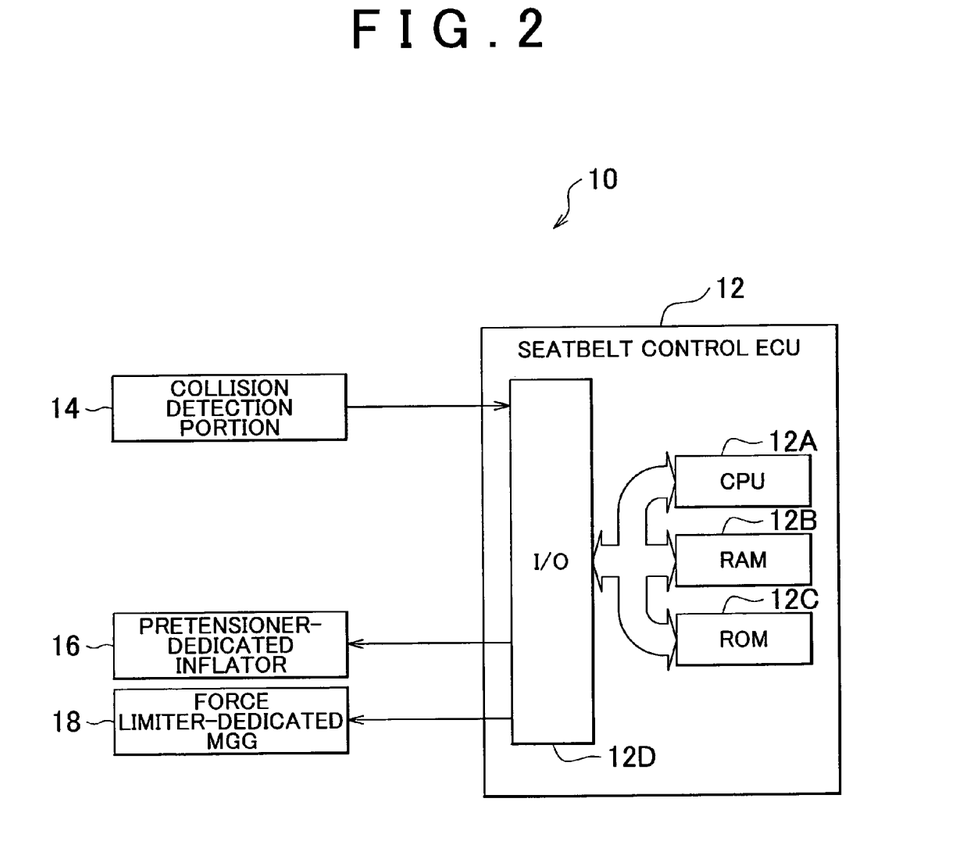
FIG. 2 is a block diagram showing a construction of the seatbelt control device in accordance with the embodiment.

FIG. 2 is a block diagram showing a construction of a seatbelt control device in accordance with the embodiment.

The seatbelt control device 10 in accordance with the embodiment controls the tension of the seatbelt 20 by a seatbelt control ECU 12 controlling the actions of the pretensioner mechanism unit 58 and the force limiter mechanism unit 60.

The seatbelt control ECU 12 is constructed of a microcomputer that includes a CPU 12A, a RAM 12B, a ROM 12C, and an input/output interface (I/O) 12D.

The ROM 12C stores various programs for controlling the tension of the seatbelt 20, threshold values for controlling the tension of the seatbelt 20, etc.

The CPU 12A expands programs stored in the ROM 12C on the RAM 12B to control the tension of the seatbelt 20.

A collision detection portion 14, the pretensioner-dedicated inflator 16, and the force limiter-dedicated MGG 18 are connected to the I/O interface 12D.

The collision detection portion 14 includes, for example, collision detection sensors provided on a vehicle floor, a front side member, etc. as well as acceleration sensors and the like. The collision detection portion 14 detects physical quantities related to a collision of the vehicle and the magnitude of the collision, and outputs detection results to the seatbelt control ECU 12.

The pretensioner-dedicated inflator 16, upon receiving an ignition signal from the seatbelt control ECU 12, generates gas, so that the piston rack 68 is moved rotating the pinion 70 and therefore rotating the spool 52. Thus, the seatbelt 20 is wound.

The force limiter-dedicated MGG 18, upon receiving an ignition signal from the seatbelt control ECU 12, generates gas, so that the cam 74 is moved to release the meshing between the cam 74 and the gear 72, so that the tension of the seatbelt 20 is kept at the tension F2 shown in FIG. 1B.

Figure 3A:
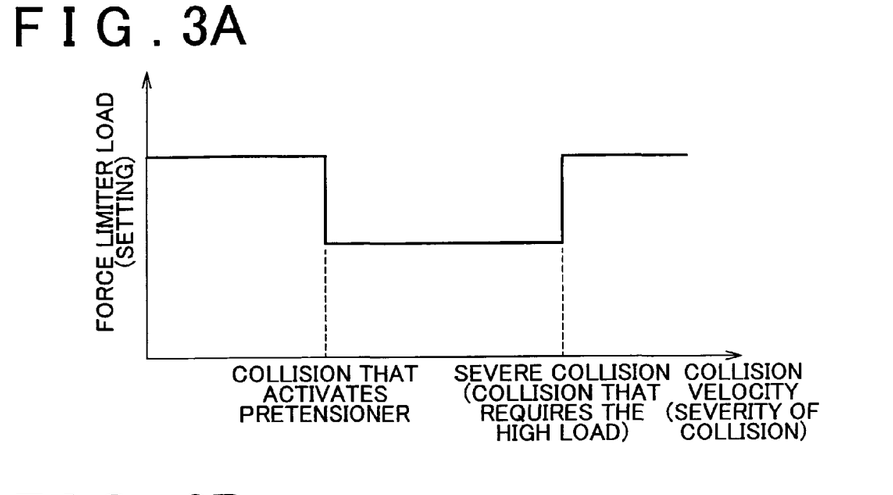
FIG. 3A is a diagram for illustrating the load setting of a force limiter mechanism unit of a seatbelt retractor device that is a control object of the seatbelt control device in accordance with the embodiment.

In the force limiter mechanism unit 60 of the seatbelt control device 10 in accordance with the embodiment, the load at which to start lessening the tension of the seatbelt 20 is set at the high load, up to a severity of collision that activates the pretensioner mechanism 64 as shown in FIG. 3A. Then, in the case where the severity of collision does not reach a predetermined severity of collision, the force limiter-dedicated MGG 18 is ignited, so that the load at which to start lessening the tension of the seatbelt 20 is set at the low load. That is, in the embodiment, the seatbelt control ECU 12 outputs the ignition signal to the pretensioner-dedicated inflator 16 to ignite the pretensioner-dedicated inflator 16, so that the seatbelt 20 is wound to restrain the occupant, in the case where a collision detected by the collision detection portion 14 reaches or exceeds a first threshold value (e.g., a predetermined collision velocity, a predetermined deceleration, etc.) that is equivalent to the predetermined severity of collision. Besides, in the case where the severity of collision detected by the collision detection portion 14 does not reach or exceed a second threshold value that is greater than the first threshold value, within a predetermined time, the seatbelt control ECU 12 performs a control of outputting the ignition signal to the force limiter-dedicated MGG 18 to ignite the force limiter-dedicated MGG 18, so that the load at which to start lessening the tension of the seatbelt 20 becomes smaller (F2 in FIG. 1B).

Figure 3B:
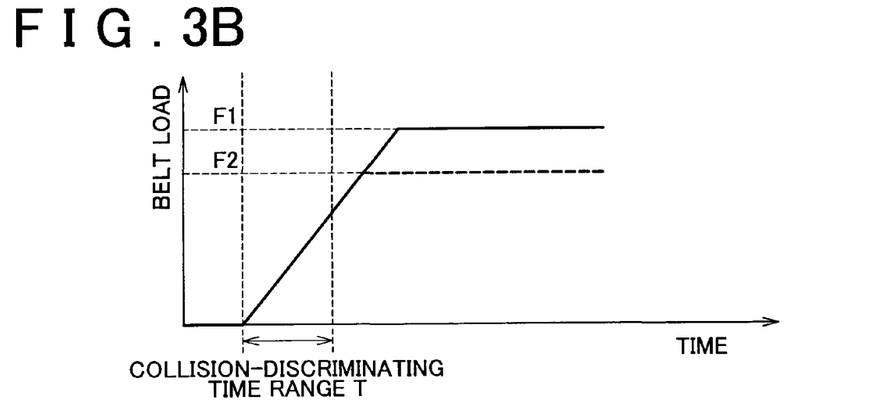
FIG. 3B is a diagram showing a relation between a collision-discriminating time range of the seatbelt control device in accordance with the embodiment, and the belt load caused by the activation of a force limiter mechanism unit of a seatbelt retractor device that is a control object.
Figure 3C:
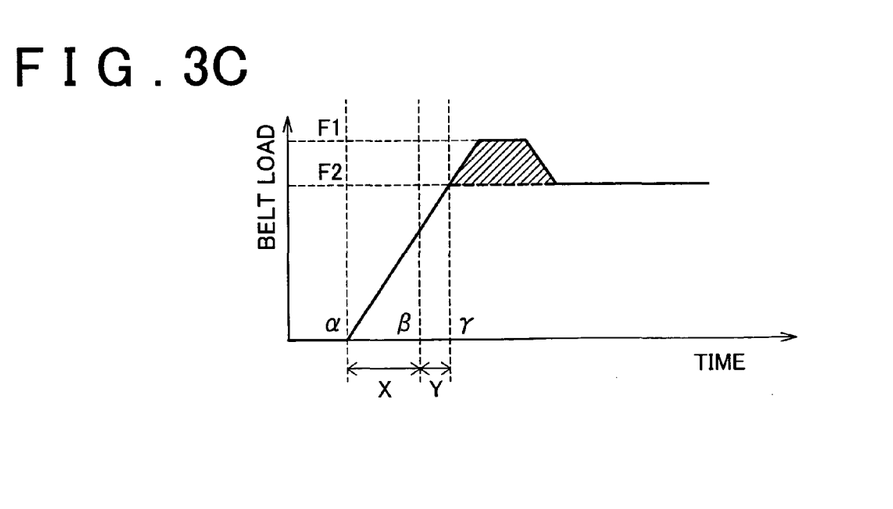
FIG. 3C is a diagram showing the setting of an activation timing of a force limiter-dedicated MGG of the seatbelt control device in accordance with the embodiment.

Besides, in this embodiment, a collision-discriminating time range T (FIG. 3B) for discriminating whether or not the severity of collision has exceeded the second threshold value after exceeding the first threshold value is pre-set. Within the time range T, it is determined whether or not the second threshold value has been exceeded. If the second threshold value is exceeded, the ignition signal is not output to the force limiter-dedicated MGG 18, but the seatbelt control ECU 12 performs such a control that the load at which to start lessening the tension of the seatbelt 20 is set at the high load (F1 in FIG. 3B). In the case where the second threshold value is not exceeded within the time range T, the seatbelt control ECU 12 outputs the ignition signal to the force limiter-dedicated MGG 18, so that the load at which to start lessening the tension of the seatbelt 20 is changed to the low load (F2 in FIG. 3B). Incidentally, as for the collision-discriminating time range T, if the discrimination is later than this time range, a region (a hatched portion in FIG. 3C) in which the tension of the seatbelt 20 is set at the high load (F1 in FIG. 3C) is entered when the tension of the seatbelt 20 should be set at the low load (F2 in FIG. 3C). Therefore, such a time that a determination delay will not occur in the case where the collision velocity is a predetermined high velocity, or where the collision deceleration is a predetermined deceleration, is set beforehand on the basis of results of experiments or the like. For example, the collision-discriminating time range T is determined by determining a determination time X as shown in FIG. 3C on the basis of a collision condition in which a time period from a pretensioner ignition timing α to a completion timing γ of the activation of the force limiter mechanism unit 60 (the determination time X+ the time Y from an ignition timing β of the force limiter-dedicated MGG 18 (an ignition timing thereof on the assumption of a worst state) to the completion timing γ) becomes the shortest.

That is, in this embodiment, in the case where the severity of collision cannot be discriminated within the collision-discriminating time range T, the collision is regarded as a collision that does not require the high load at which to start lessening the tension of the seatbelt 20, and the low load (F2 in FIG. 3B) is compulsorily selected when the time range T elapses after the first threshold value is exceeded and the activation of the pretensioner mechanism 64 that is started.

Figure 4:
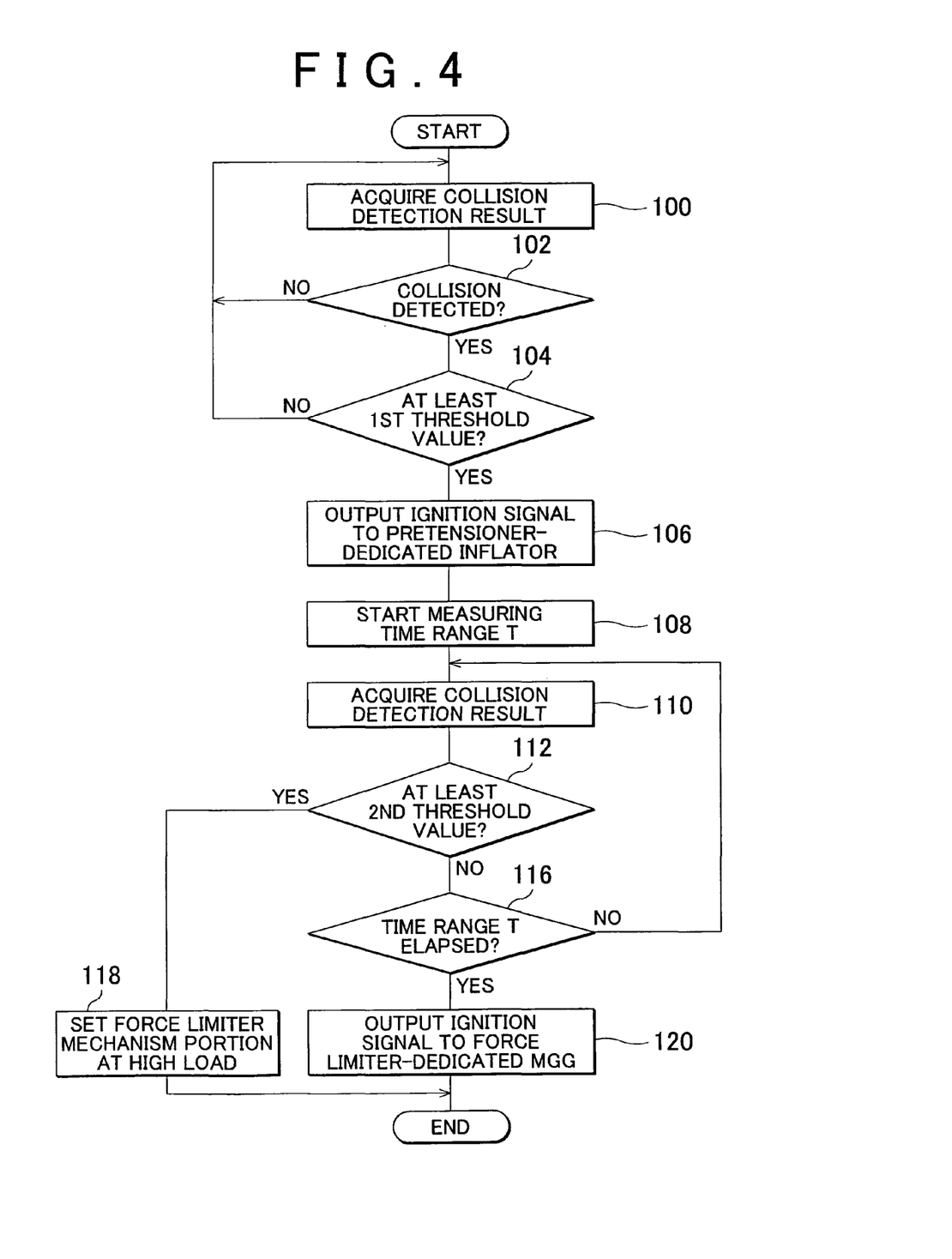
FIG. 4 is a flowchart showing an example of the flow of a process performed by the seatbelt control device in accordance with the embodiment.

Subsequently, processes performed by the seatbelt control device 10 in accordance with the embodiment of the invention constructed as described above will be described. FIG. 4 is a flowchart showing an example of a flow of a process performed by the seatbelt control device 10 in accordance with the embodiment of the invention. Incidentally, the process shown in FIG. 4 starts, for example, when an ignition switch (not shown) is turned on.

Firstly, in step 100, a collision detection result is acquired from the collision detection portion 14 by the CPU 12A. Then, the process proceeds to step 102.

In step 102, the CPU 12A determines whether or not a collision has been detected on the basis of the detection result provided by the collision detection portion 14. If the determination is negative, the process returns to step 100 to repeat the foregoing process. When an affirmative determination is made in step 102, the process then proceeds to step 104.

In step 104, it is determined whether or not the severity of collision detected by the collision detection portion 14 is greater than or equal to the first threshold value. This determination is to determine whether or not a physical quantity detected by the collision detection portion 14, such as the collision velocity, the acceleration, etc., has become equal to or greater than the predetermined first threshold value. If the determination is negative, the process proceeds to step 100 to repeat the foregoing process. When an affirmative determination is made in step 104, the process then proceeds to step 106.

In step 106, the CPU 12A outputs an ignition signal to the pretensioner-dedicated inflator 16. Then, the process proceeds to step 108. That is, the pretensioner-dedicated inflator 16 is ignited, so that the seatbelt 20 is wound. Therefore, the occupant can be restrained, and can be protected from the impact of the collision.

Next in step 108, the measurement of the collision-discriminating time range T is started. Then, the process proceeds to step 110.

In step 110, a collision detection result provided by the collision detection portion 14 is acquired by the CPU 12A again. Then, the process proceeds to step 112.

In step 112, it is determined whether or not the severity of collision is greater than or equal to the second threshold value, on the basis of the detection result provided by the collision detection portion 14. This determination is to determine whether or not the physical quantity detected by the collision detection portion 14, such as the collision velocity, acceleration, etc., has become equal to or greater than the second threshold value. If the determination is affirmative, the process proceeds to step 118. If the determination is negative, the process proceeds to step 116.

In step 118, the force limiter mechanism unit 60 is set at the high load (F1 in FIG. 3B) by the CPU 12A. After that, this series of process ends. That is, the ignition signal to the force limiter-dedicated MGG 18 is not output, but the load at which the force limiter mechanism unit 60 starts lessening the tension of the seatbelt 20 is set at the high load.

On the other hand, in step 116, which follows the negative determination in step 112, the CPU 12A determines whether or not the collision-discriminating time range T has elapsed. If the determination is negative, the process returns to step 110 to repeat the forgoing process. If the determination is affirmative, the process proceeds to step 120.

In step 120, the CPU 12A outputs the ignition signal to the force limiter-dedicated MGG 18. After that, the series of process ends. That is, the force limiter-dedicated MGG 18 is ignited, so that the load at which to start lessening the tension of the seatbelt 20 is set to the low load.

Figure 5:
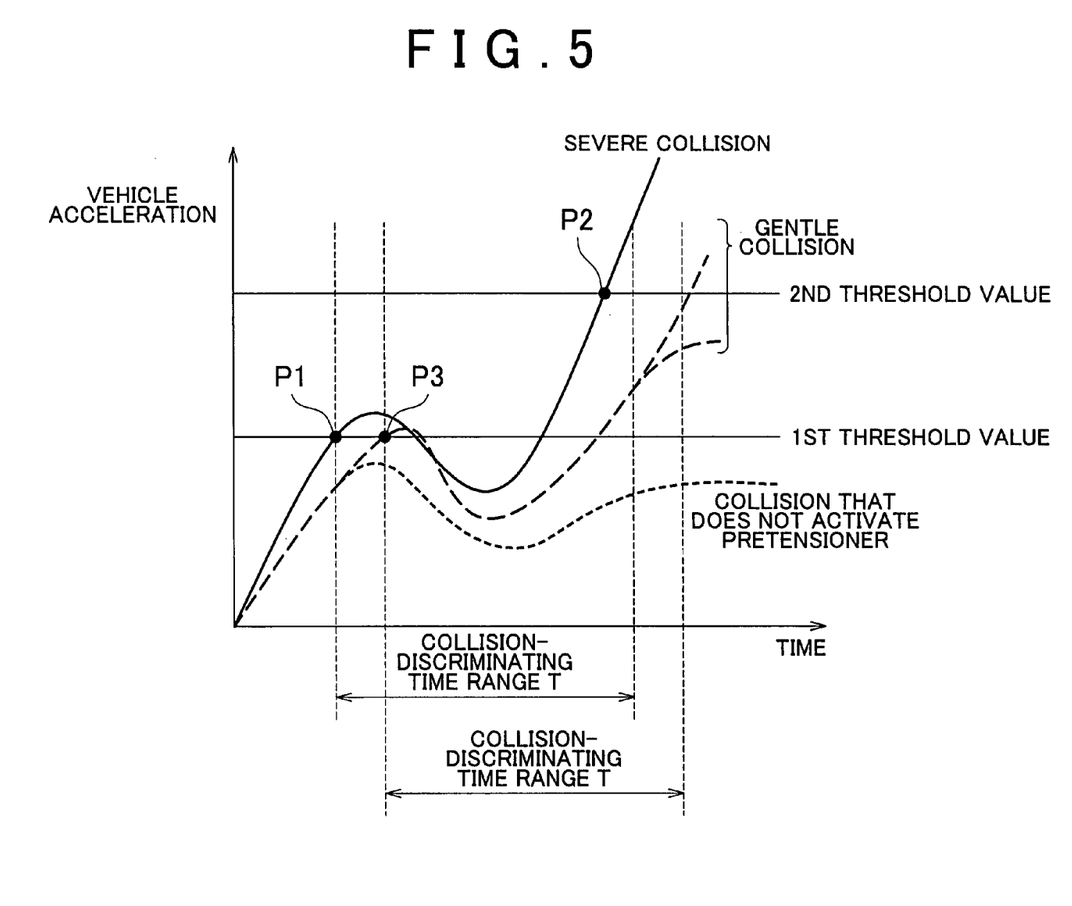
FIG. 5 is a diagram for illustrating an example of a control that is performed by the seatbelt control device in accordance with the embodiment.

That is, in the case of a collision that does not activate the pretensioner mechanism 64 as shown in FIG. 5, since neither the first threshold value nor the second threshold value is exceeded, the seatbelt control device 10 in accordance with this embodiment remains as it is. Besides, in the case of a severe collision as shown in FIG. 5, the severity of collision exceeds the first threshold value (P1 in FIG. 5), at which the pretensioner mechanism 64 starts to activate, and then exceeds the second threshold value within the collision-discriminating time range T following the start of activation of the pretensioner mechanism 64 (P2 in FIG. 5), and therefore the force limiter mechanism unit 60 is set at the high load. That is, the ignition signal is not output to the force limiter-dedicated MGG 18, but the force limiter mechanism unit 60 maintains its initial state.

On the other hand, in the case of a gentle collision as shown in FIG. 5, the severity of collision exceeds the first threshold value, at which the pretensioner mechanism 64 starts to activate (P3 in FIG. 5), but the severity of collision does not exceed the second threshold value within the collision-discriminating time range T following the start of the activation of the pretensioner mechanism 64, so that the force limiter mechanism unit 60 is compulsorily set at the low load at the elapse of the collision-discriminating time range T. That is, at the elapse of the time range T, the ignition signal is output to ignite the force limiter-dedicated MGG 18, whereby the load at which to start lessening the tension of the seatbelt 20 is set to the low load. Therefore, without a determination delay, the switching of the force limiter mechanism unit 60 can be appropriately selected.

Incidentally, although in the foregoing embodiment, the load of the force limiter mechanism unit 60 is switched according to whether or not the second threshold value has been exceeded, it is also permissible to switch the load of the force limiter mechanism unit 60 by determining whether or not the second threshold value will be exceeded. In this case, the seatbelt control ECU 12 finds a rate of change in the severity of collision (e.g., the gradient of each curve in FIG. 5) while acquiring the detection result from the collision detection portion 14. Then, it is discerned whether or not the thus-found rate of change will exceed the second threshold value within the collision-discriminating time range T following the start of activation of the pretensioner mechanism 64. If the second threshold value will be exceeded, the force limiter mechanism unit 60 is set at the high load. That is, if it is predicted that the second threshold value is exceeded within the time range T, the ignition signal is not output to the force limiter-dedicated MGG 18, but the force limiter mechanism unit 60 is set so as to maintain its initial state as it is. Besides, if it is predicted that the second threshold value is not exceeded within the collision-discriminating time range T following the start of activation of the pretensioner mechanism 64, such a setting is made as to ignite the force limiter-dedicated MGG 18 after the elapse of the collision-discriminating time range T, whereby the force limiter mechanism unit 60 is set at the low load.

Figure 6:
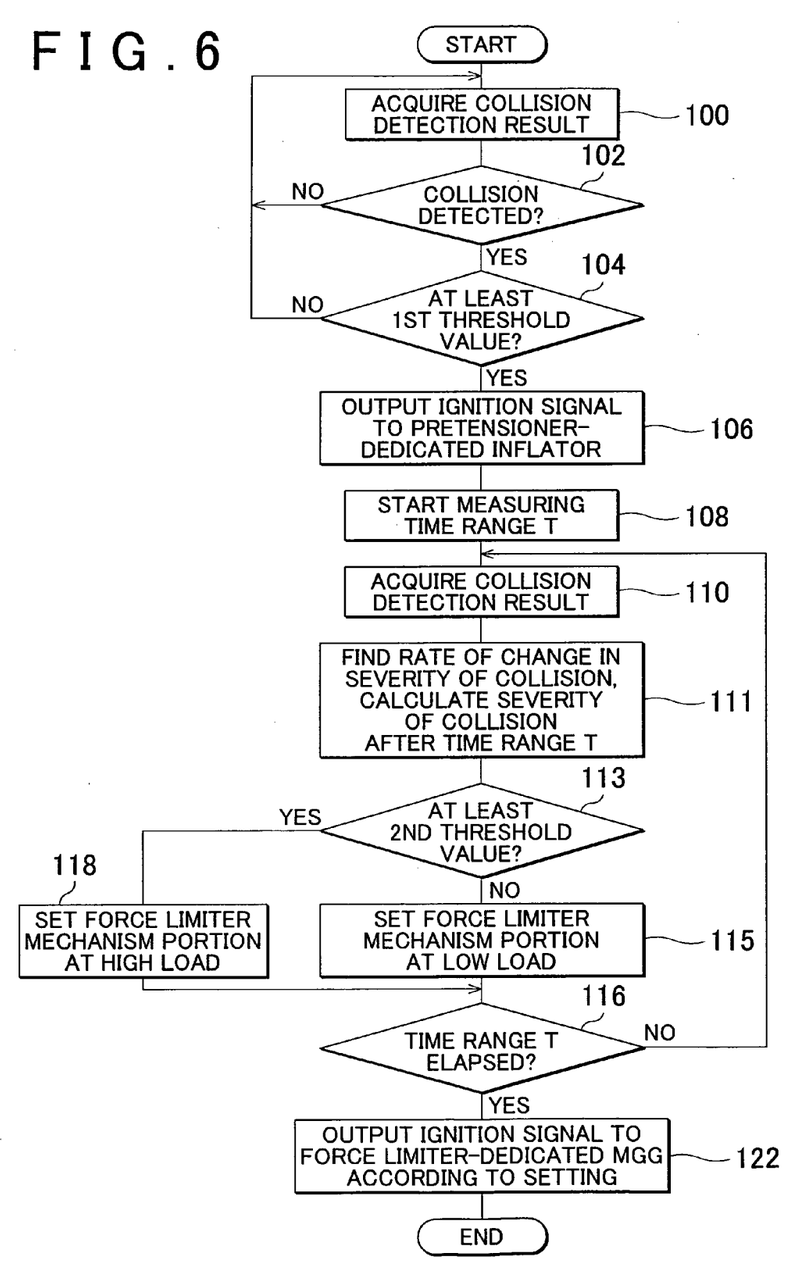
FIG. 6 is a flowchart showing a flow of a process that is performed in a modification of the seatbelt control device in accordance with the embodiment.

Herein, a process performed to discern whether or not the second threshold value of the severity of collision will be exceeded within the collision-discriminating time range T will be described. FIG. 6 is a flowchart showing a flow of a process performed in a modification of the seatbelt control device in accordance with the embodiment of the invention. Incidentally, the same processes as those in the foregoing embodiment are presented with the same reference characters in the following description. Besides, the process shown in FIG. 6 starts, for example, when the ignition switch (not shown) is turned on, or the like.

Firstly, in step 100, a collision detection result is acquired from the collision detection portion 14 by the CPU 12A. Then, the process proceeds to step 102.

In step 102, the CPU 12A determines whether or not a collision has been detected on the basis of the detection result provided by the collision detection portion 14. If the determination is negative, the process returns to step 100 to repeat the foregoing process. When an affirmative determination is made in step 102, the process then proceeds to step 104.

In step 104, it is determined whether or not the severity of collision detected by the collision detection portion 14 is greater than or equal to the first threshold value. This determination is to determine whether or not a physical quantity detected by the collision detection portion 14, such as the collision velocity, the acceleration, etc., has become equal to or greater than the predetermined first threshold value. If the determination is negative, the process proceeds to step 100 to repeat the foregoing process. When an affirmative determination is made in step 104, the process then proceeds to step 106.

In step 106, the CPU 12A outputs an ignition signal to the pretensioner-dedicated inflator 16. Then, the process proceeds to step 108. That is, the pretensioner-dedicated inflator 16 is ignited, so that the seatbelt 20 is wound. Therefore, the occupant can be restrained, and can be protected from the impact of the collision.

Next in step 108, the measurement of the collision-discriminating time range T is started. Then, the process proceeds to step 110.

In step 110, a collision detection result provided by the collision detection portion 14 is acquired by the CPU 12A again. Then, the process proceeds to step 112.

In step 111, a rate of change in the severity of collision detected by the collision detection portion 14 is found, and from the rate of change, the severity of collision following the collision-discriminating time range T is calculated. Then, the process proceeds to step 113. For example, from values of a physical quantity that changes as time elapses, such as the collision velocity, the acceleration, etc., the rate of change of the physical quantity is found, and then from the found rate of change, a value of the physical quantity that occurs at the elapse of the time range T is predicted.

In step 113, it is determined whether or not the severity of collision calculated in step 111 becomes greater than or equal to the second threshold value. If the determination is affirmative, the process proceeds to step 118. If the determination is negative, the process proceeds to step 115.

In step 118, the force limiter mechanism unit 60 is set at the high load (F1 in FIG. 3B) by the CPU 12A. After that, process proceeds to step 116. That is, the ignition signal to the force limiter-dedicated MGG 18 is not output, but the load at which the force limiter mechanism unit 60 starts lessening the tension of the seatbelt 20 is set so as to be the high load.

On the other hand, in step 115, the force limiter mechanism unit 60 is set at the low load (F2 in FIG. 3B) by the CPU 12A. Then, process proceeds to step 116. Specifically, a setting is made so as to output the ignition signal to the force limiter-dedicated MGG 18, and the load at which the force limiter mechanism unit 60 starts lessening the tension of the seatbelt 20 is set so as to be the low load.

In step 116, the CPU 12A determines whether or not the collision-discriminating time range T has elapsed. If the determination is negative, the process returns to step 110 to repeat the forgoing process. If the determination is affirmative, the process proceeds to step 122.

In step 122, the CPU 12A outputs the ignition signal to the force limiter-dedicated MGG 18 according to the setting made in step 115. After that, the series of process ends. That is, in the case of the low load setting, the force limiter-dedicated MGG 18 is ignited, so that the load at which to start lessening the tension of the seatbelt 20 is set to the low load. In the case of the high load setting, the ignition signal is not output to the force limiter-dedicated MGG 18, but the initial state of the force limiter-dedicated MGG 18 is maintained.

Thus, substantially the same effects of those of the foregoing embodiment can also be achieved by predicting whether or not the severity of collision will exceed the second threshold value within the collision-discriminating time range T, and then correspondingly setting the load of the force limiter mechanism unit 60.

Figure 7:
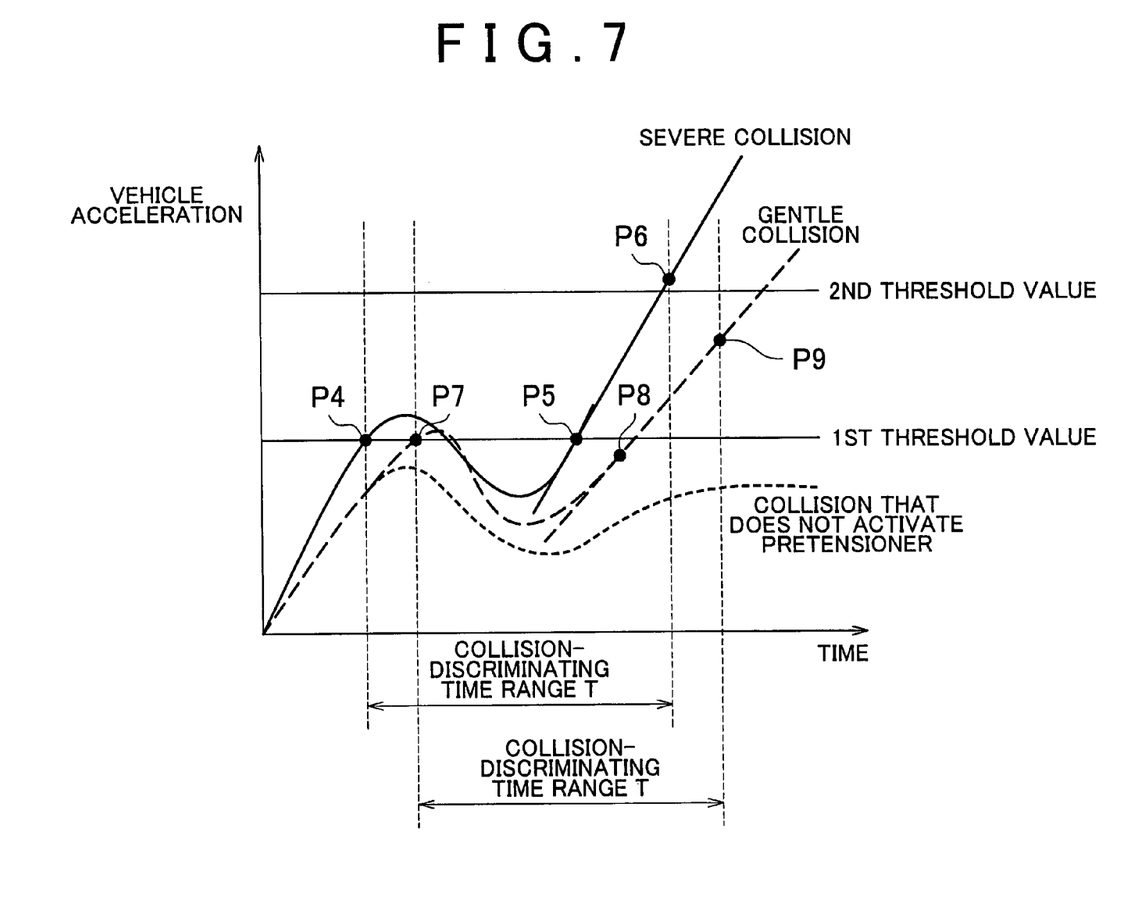
FIG. 7 is a diagram for illustrating an example of a control that is performed by a modification of the seatbelt control device in accordance with the embodiment.

That is, in the case of a collision that does not activate the pretensioner mechanism 64 as shown in FIG. 7, since neither the first threshold value nor the second threshold value is exceeded, the seatbelt control device 10 in accordance with this embodiment remains as it is. Besides, in the case of a severe collision, since it is predicted that the severity of collision exceeds the second threshold value (P6 in FIG. 7) within the collision-discriminating time range T, which is based on the rate of change in the severity of collision at a specific timing (P5 in FIG. 7), after the start of activation of the pretensioner mechanism 64 that is caused when the first threshold value of the severity of collision is exceeded (P4 in FIG. 7), and therefore the force limiter mechanism unit 60 is set at the high load. That is, the ignition signal is not output to the force limiter-dedicated MGG 18, but the force limiter mechanism unit 60 maintains its initial state.

On the other hand, in the case of a gentle collision, since it is predicted that the severity of collision does not exceed the second threshold value within the collision-discriminating time range T (P9 in FIG. 7), which is based on the rate of change in the severity of collision at a specific timing (P8 in FIG. 7), after the start of activation of the pretensioner mechanism 64 that is caused when the first threshold value of the severity of collision is exceeded (P7 in FIG. 7), the force limiter mechanism unit 60 is compulsorily set at the low load at the elapse of the collision-discriminating time range T. That is, at the elapse of the time range T, the ignition signal is output to ignite the force limiter-dedicated MGG 18, whereby the load at which to start lessening the tension of the seatbelt 20 is set to the low load. Therefore, without a determination delay, the switching of the force limiter mechanism unit 60 can be appropriately selected.

Incidentally, in the process shown by the flowchart of FIG. 6, at the elapse of the time range T, the force limiter mechanism unit 60 is controlled so as to achieve the load set in step 115 or step 118. However, this is not restrictive. For example, after the load of the force limiter mechanism unit 60 is set to the high load in step 118 based on the determination in step 113, the load of the force limiter mechanism unit 60 may be immediately controlled without waiting for the determination in step 116 that the time range T has elapsed, whereby the switching delay of the force limiter mechanism unit 60 can be curbed. In this case, the prediction accuracy is less than in the case where the load of the force limiter mechanism unit 60 is controlled after the time range T elapses; however, since the switching delay caused by the determination delay can be certainly prevented, the switching of the force limiter mechanism can be appropriately selected. Besides, in this case, the prediction accuracy can be improved by predicting whether or not the severity of collision becomes equal to or greater than the second threshold value after the time range T, by taking into account the inflection point of a curve shown in FIG. 7 that is caused by the structure of the vehicle body. For example, the prediction accuracy can be improve by predicting whether or not the severity of collision becomes equal to or greater than the second threshold value after the elapse of the time range T on the basis of the rate of change in the severity of collision (e.g., corresponding to the slope of a tangential line (i.e., foregoing slope is equal to a differential value of the curve at a specific timing)), at a specific timing in a period from the detection of a minimum point where the vehicle acceleration following the activation of the pretensioner becomes the smallest until the second threshold value is reached.

Besides, although in the foregoing embodiment, the threshold value for activation of the pretensioner mechanism 64 is simply shown as the first threshold value, this is not restrictive. For example, by applying the ignition determination regarding an airbag described in Japanese Patent No. 3608052, which has been proposed by the present applicant, the pretensioner-dedicated inflator 16 may also be ignited in accordance with the ignition determination of the airbag that is performed while threshold value maps are switched. That is, since the impact on an occupant varies depending on the form of collision (e.g., a high-speed oblique collision, a low-speed frontal collision, an under-ride collision, etc.), the pretensioner-dedicated inflator 16 may be ignited by discerning the form of a collision on the basis of the timing of a peak value of the front deceleration that acts on a vehicle front portion, and by switching among a plurality of threshold value patterns of the first threshold value.

Besides, although in the foregoing embodiment, the severity of collision is determined on the basis of the two fixed thresholds, that is, the first threshold value and the second threshold value, this is not restrictive. For example, the threshold value may also be switched according to the form of collision, by applying the determination as to whether to set the two inflators of an airbag to the high output or to the low output which is described in Japanese Patent No. 3487279 proposed by the present applicant. Specifically, since the impact on an occupant varies depending on the form of collision (e.g., an ODB type offset collision, an oblique collision, etc.), the pretensioner-dedicated inflator 16 and the force limiter-dedicated MGG 18 may be ignited by discerning the form of a collision, and by switching among a plurality of threshold value patterns of the first threshold value and the second threshold value.

Besides, the foregoing embodiment is described in conjunction with an example in which the load of the force limiter mechanism unit 60 can be changed between two values of the load, that is, the high load and the low load. However, the number of values or kinds of load among which the load of the force limiter mechanism unit 60 can be changed is not limited to two, but the invention may also be applied to a force limiter mechanism unit that is able to change the load among two or more values or kinds of load.

Furthermore, in the foregoing embodiment, the load during the initial state at which the force limiter mechanism unit 60 starts lessening the tension of the seatbelt 20 is set at the high load, the invention may also be applied to a force limiter mechanism unit that is set at the low load as an initial state. In this case, the cam 74 and the gear 72 of the force limiter mechanism unit 60 are not in mesh, and the force limiter mechanism unit 60 is set at the low load. Then, when the force limiter-dedicated MGG 18 is ignited, the cam 74 and the gear 72 of the force limiter mechanism unit 60 mesh with each other, so that the force limiter mechanism unit 60 is set at the high load. That is, it suffices to maintain the low load in the initial state in the case where the second threshold value is not exceeded within the collision-discriminating time range T, and then to change the load to the high load in the case where the second threshold value is exceeded within the collision-discriminating time range T. In the case of the force limiter mechanism unit 60 that is set at the low load during an initial state, and is set at the high load in the case where the severity of collision exceeds the second threshold value within the time range T, there is no need to switch the set load of the force limiter from the high load to the low load at the time of a gentle collision, and therefore it never happens that the force limiter's set load is the high load at the time of a gentle collision.

The invention claimed is:

1. A vehicle seatbelt control device comprising:
a pretensioner mechanism that heightens tension of a seatbelt by winding the seatbelt upon a collision of a vehicle;
a force limiter mechanism capable of changing magnitude of a load at which to start lessening the tension of the seatbelt wound by the pretensioner mechanism;
a detection portion that detects a physical quantity related to magnitude of a collision; and
a control portion that activates the pretensioner mechanism if the physical quantity detected by the detection portion has exceeded a first threshold value, and that performs such a control that the load in a case where the physical quantity has exceeded a second threshold value that is larger than the first threshold value within a predetermined time range following activation of the pretensioner mechanism is larger than the load in a case where the physical quantity does not exceed the second threshold value within the predetermined time range.

2. The vehicle seatbelt control device according to claim 1, wherein the force limiter mechanism is capable of changing the load between a first load and a second load that is smaller than the first load.

3. The vehicle seatbelt control device according to claim 2, wherein the force limiter mechanism is set at the first load during an initial state, and the control portion causes the first load to be maintained in the case where the physical quantity has exceeded the second threshold value within the predetermined time range, and the control portion switches the load to the second load in the case where the physical quantity does not exceed the second threshold value within the predetermined time range.

4. The vehicle seatbelt control device according to claim 2, wherein the force limiter mechanism is set at the second load during an initial state, and the control portion switches the load to the first load in the case where the physical quantity has exceeded the second threshold value within the predetermined time range,
and the control portion maintains the second load in the case where the physical quantity does not exceed the second threshold value within the predetermined time range.

5. A vehicle seatbelt control device comprising:
a pretensioner mechanism that heightens tension of a seatbelt by winding the seatbelt upon a collision of a vehicle;
a force limiter mechanism capable of changing magnitude of a load at which to start lessening the tension of the seatbelt wound by the pretensioner mechanism;
a detection portion that detects a physical quantity related to magnitude of a collision; and
a control portion that activates the pretensioner mechanism if the physical quantity detected by the detection portion has exceeded a first threshold value, and that discerns whether or not the physical quantity is likely to exceed a second threshold value that is larger than the first threshold value within a predetermined time range following activation of the pretensioner mechanism, and sets the load in a case where the physical quantity is likely to exceed the second threshold value at a load that is larger than the load in a case where the physical quantity is not likely to exceed the second threshold value within the predetermined time range.

6. The vehicle seatbelt control device according to claim 5, wherein the force limiter mechanism is capable of changing the load between a first load and a second load that is smaller than the first load.

7. The vehicle seatbelt control device according to claim 6, wherein the force limiter mechanism is set at the first load during an initial state, and the control portion causes the first load to be maintained in the case where the physical quantity is likely to exceed the second threshold value within the predetermined time range, and the control portion switches the load to the second load in the case where the physical quantity is not likely to exceed the second threshold value within the predetermined time range.

8. The vehicle seatbelt control device according to claim 6, wherein the force limiter mechanism is set at the second load during an initial state, and the control portion switches the load to the first load in the case where the physical quantity is likely to exceed the second threshold value within the predetermined time range, and the control portion maintains the second load in the case where the physical quantity is not likely to exceed the second threshold value within the predetermined time range.

9. The vehicle seatbelt control device according to claim 5, wherein the control portion finds a rate of change in the physical quantity from a detection result provided by the detection portion, and discerns whether or not the physical quantity is likely to exceed to the second threshold value through prediction based on the rate of change.

10. The vehicle seatbelt control device according to claim 9,
wherein the control portion calculates the rate of change in the physical quantity at a specific timing in a period from a point of a minimum until the second threshold value that is larger than the minimum is achieved, which is a physical quantity detected by the detection portion, and predicts whether or not the second threshold value is exceeded based on the rate of change.

11. The vehicle seatbelt control device according to claim 5, wherein the control portion controls the force limiter mechanism so that a set load is realized after the predetermined time range elapses.

12. The vehicle seatbelt control device according to claim 9,
wherein the control portion controls the force limiter mechanism so that a set load is achieved even before the predetermined time range elapses, if it is predicted based on the rate of change that the second threshold value is exceeded.

13. The vehicle seatbelt control device according to claim 1, wherein the pretensioner mechanism includes a pretensioner-dedicated inflator, and
the control portion activates the pretensioner-dedicated inflator if the physical quantity detected by the detection portion has exceeded the first threshold value.

14. A vehicle seatbelt control device according to claim 1, wherein
the force limiter mechanism begins to work when the seatbelt is drawn out by a forward movement of an occupant after the activation of the pretensioner mechanism.

15. A vehicle seatbelt control device according to claim 14, wherein
the force limiter mechanism includes a torsion bar,
the torsion bar is twisted when the seatbelt is drawn out by the forward movement of the occupant, and
the load at which to start lessening the tension of the seatbelt is a load when the tension bar is twisted.

16. A method of controlling the tension of a vehicle seatbelt comprising the following steps:
detecting a physical quantity related to magnitude of a collision of a vehicle;
activating a pretensioner mechanism if the detected physical quantity has exceeded a first threshold value;
heightening a tension of the seatbelt by the pretensioner mechanism upon the collision; and
starting lessening the tension of the seatbelt by a force limiter mechanism capable of changing magnitude of a load, wherein
it is performed such a control that the load in a case where the physical quantity has exceeded a second threshold value that is larger than the first threshold value within a predetermined time range following activation of the pretensioner mechanism is set larger than the load in a case where the physical quantity does not exceed the second threshold value within the predetermined time range.

17. A method of controlling the tension of a vehicle seatbelt comprising the following steps:
detecting a physical quantity related to magnitude of a collision of a vehicle;
activating a pretensioner mechanism if the detected physical quantity has exceeded a first threshold value;
heightening the tension of the seatbelt by the pretensioner mechanism upon the collision; and
starting lessening the tension of the seatbelt by a force limiter mechanism capable of changing magnitude of a load, wherein
it is discerned whether or not the physical quantity is likely to exceed a second threshold value that is larger than the first threshold value within a predetermined time range following activation of the pretensioner mechanism, and
the load in a case where the physical quantity is likely to exceed the second threshold value is set to be larger than the load in a case where the physical quantity is not likely to exceed the second threshold value within the predetermined time range.

18. The vehicle seatbelt control device according to claim 5, wherein
the pretensioner mechanism includes a pretensioner-dedicated inflator, and
the control portion activates the pretensioner-dedicated inflator if the physical quantity detected by the detection portion has exceeded the first threshold value.

19. A vehicle seatbelt control device according to claim 5, wherein
the force limiter mechanism begins to work when the seatbelt is drawn out by a forward movement of an occupant after the activation of the pretensioner mechanism.

20. A vehicle seatbelt control device according to claim 19, wherein
the force limiter mechanism includes a torsion bar,
the torsion bar is twisted when the seatbelt is drawn out by the forward movement of the occupant, and
the load at which to start lessening the tension of the seatbelt is a load when the tension bar is twisted.

* * * * *